June 6, 1933.  J. ROBINSON  1,913,059
VAPORIZER
Original Filed June 2, 1928
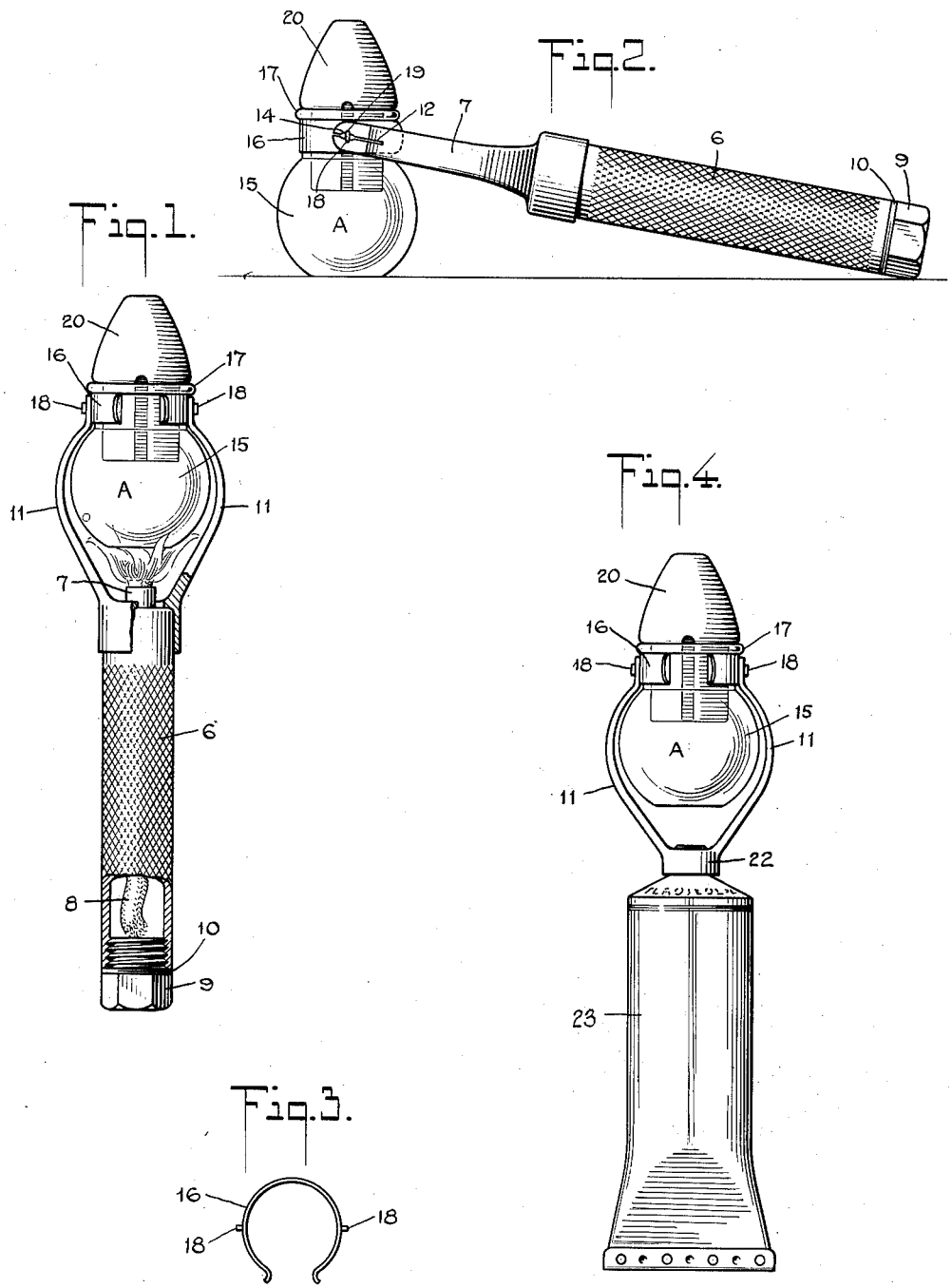
INVENTOR
Joseph Robinson
BY
ATTORNEYS Patented June 6, 1933

1,913,059

UNITED STATES PATENT OFFICE

JOSEPH ROBINSON, OF NEW YORK, N. Y.

VAPORIZER

Application filed June 2, 1928, Serial No. 282,360. Renewed October 29, 1932.

My invention relates to improvements in vaporizers of the individual hand type, heated non-electrically, for the treatment of head colds and other head afflictions by generating vapors of any desired medicinal compound and applying them, by inhalation, while hot. My invention is very useful in the treatment of sinus which has become a prevalent affliction especially in the industrial centers. Among the objects is to provide a simple inexpensive vaporizer conveniently mounted for use and for carrying about, and heated with a small alcohol burner, or by a heating compound similar to solidified alcohol.

In the drawing Figure 1 is a vertical sectional view of one form of my invention.

Figure 2 is a side elevation of the construction shown in Figure 1 as it would appear placed on a table or shelf.

Figure 3 is a plan view of the snap ring or collar by which the container of my invention is supported, and Figure 4 is a side elevation of a modification of the heating means of my invention.

Referring to the drawing. I provide a suitable hollow barrel or handle 6 terminating at its upper end in a neck 7 through which a wick 8 projects. The lower end of the handle is closed by a suitable cap or plug 9 threaded or otherwise secured in the handle 6. A gasket 10 is used to seal the joint. The handle 6 contains the liquid used for heating the medicine, the liquid preferably being alcohol. Over the upper end of the barrel I suitably mount a yoke having spring arms 11 slotted at their upper end as at 12 and provided with a bearing 14 therein, as illustrated especially in Figure 2. These arms or prongs 11 are shaped to conform generally to the outline of the container 15 of my invention. The container may be cylindrical in form, or provided with an enlarged body or bowl A as illustrated, preferably the latter, as it gives weight to that part of the container which is below the swivel joint, presently to be described, and hence helps to keep it in the proper vertical position. Around the neck of the container and above the bowl A, I mount a snap ring 16, illustrated clearly in Figure 3. The ring being made preferably of spring steel is slipped into position from any side of the container, the latter being supported against downward movement therein by the flange 17. On opposite sides the ring carries elongated trunnions 18 which are mounted in bearings 14, Figure 2, of the prongs 11. The arrangement is such that the prongs slightly grip the sides of the trunnions 18 and tend to keep the container or vial 15 in the vertical position shown in Figure 1. If however it is desired to lay the vaporizer down as shown in Figure 2, the container is rotated to one side at which time the trunnions 18 snap into small seats 19 in the sides of the bearing 14. This arrangement keeps the container in the vertical position when the handle 6 is inclined as indicated in Figure 2. The container may be made of any suitable material preferably a translucent material of high heat resisting qualities affording protection against breakage. The medicament to be heated is placed in the bowl of the container, after which the nozzle or button 20 is passed down into the neck of the container, vents 21 being provided to permit the passage of air into the container on inhalation.

When it is desired to vaporize a medicament with my invention it is necessary to light the burner for a few seconds only. The rapid vaporizing speed of my invention will be enhanced by placing in the container a relatively small amount of the medicament to be vaporized. The vapors generated are, of course, lifted up through the hollow nasal button 20 by inhalation, and are carried directly to the afflicted membranes while hot.

In Figure 4 is illustrated a modified form of the heating means of my invention. This consists in threading the lower portion or base 22 of the prongs 11 to receive a tube 23 containing a jelly like heating material similar to solidified alcohol. When it is desired, with this form of my invention, to vaporize the medicament in the bowl A, the tube 23 is pressed slightly causing the heating material to protrude out of the top of the tube at which time it is ignited. If desired, a cap may be placed over the threaded upper end of the tube to prevent possible vaporization of the heating material contained in it. Likewise a similar cap may be mounted on the neck 7 of the barrel or handle 6 of the construction shown in Figures 1 and 2.

What I claim is:

In an instrument of the class described, a hollow member containing a fuel, a vertically extending support mounted on one end of said member, a collar pivotally mounted in the upper end of said support, a container carried by said collar and adapted to rotate therewith and receive a medicament to be vaporized, means for lifting said fuel to a point where it may be ignited, and a part through which said vapors are lifted by inhalation.

In testimony whereof I affix my signature.

JOSEPH ROBINSON.